June 12, 1934.  O. E. ANDRUS  1,962,168
LINED PRESSURE VESSEL
Filed July 30, 1930
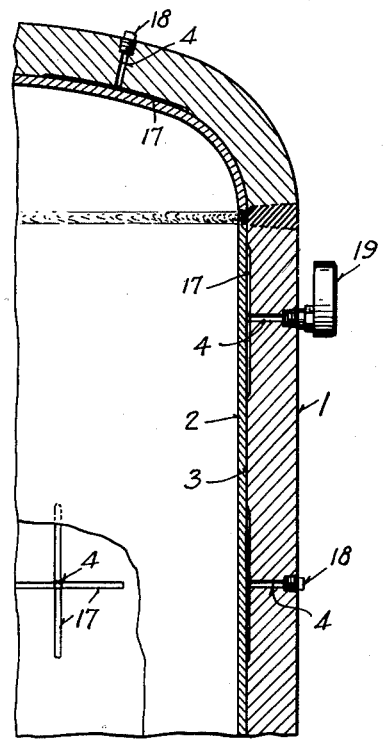
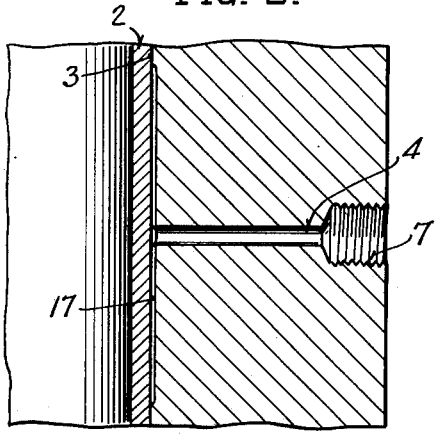
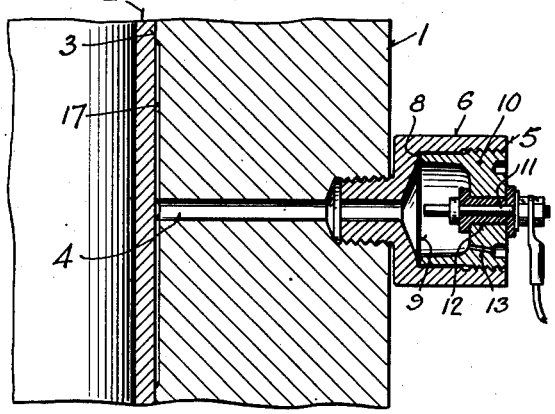
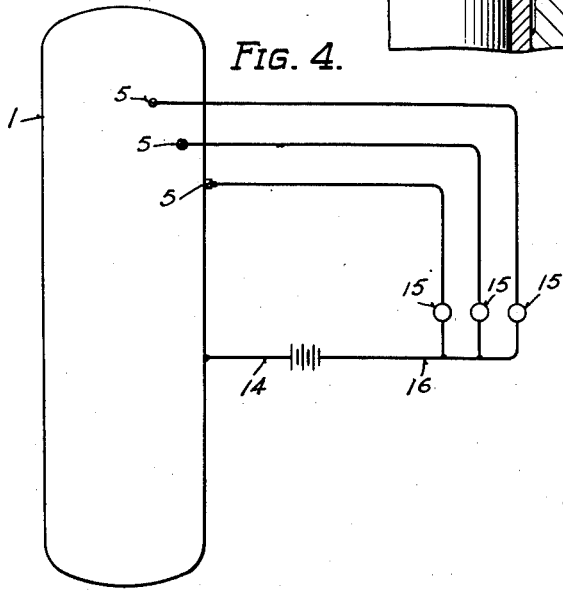
INVENTOR.
Orrin E. Andrus
BY
ATTORNEY.

UNITED STATES PATENT OFFICE 1,962,168

LINED PRESSURE VESSEL

Orrin E. Andrus, Wauwatosa, Wis., assignor to A. O. Smith Corporation, Milwaukee, Wis., a corporation of New York Application July 30, 1930, Serial No. 471,869

6 Claims. (Cl. 177—311)

The present invention relates to lined pressure vessels.

An object of the invention is to provide means for detecting and indicating the presence of corrosive agents between the lining and the wall proper of oil cracking vessels and the like.

The invention will be best understood by referring to the accompanying drawing in which:

Figure 1 is a longitudinal sectional view of a portion of a lined pressure vessel showing parts of the liner broken away.

Fig. 2 is an enlarged longitudinal sectional view of a portion of a vessel showing a perforation, the periphery of the enlarged outer end of which is threaded to receive indicating means and showing a groove embossed in the liner for conducting leaking fluid to the perforation.

Fig. 3 is a longitudinal sectional view through the vessel wall and liner showing the opening in the vessel wall and indicating means attached thereto, portions of which are cut away.

Fig. 4 is a diagrammatic view of the wiring system of the indicating apparatus shown in Fig. 3.

A vessel made in accordance with the present invention is preferably fabricated from steel plates which are rolled into cylindrical form and welded into a unitary structure.

The walls 1 of the vessel are of substantial thickness to resist the pressures to which the vessel is subjected in use.

A lining 2 of corrosion resisting metal such as chromium alloy is applied by suitable means, as by welding, to the inner surface 3 of the wall 1 of the vessel to protect the wall from the attacks of corrosive fluids. The preferred mode of attaching the liner sheet to the vessel wall and the structure thus provided constitute the subject of a Patent No. 1,680,276 issued on August 14, 1928 to Orrin E. Andrus and Sune Hermanson. The present invention in its more specific aspect constitutes an improvement in the structure of the vessel whereby any injury to the lining may be readily detected.

The vessel may be in continuous operation for some length of time without shutdown. In the course of its use, it is possible that the lining may in some way be damaged. The circulation of corrosive fluids against the unprotected wall 1 might cause considerable injury to the vessel before the leak is detected and repaired.

The present invention has for its purpose the protection of vessels by indicating damage to the protective lining. This enables an immediate repair and prevents the vessel from being injured.

In carrying out the invention, the vessel wall 1 is provided with a number of small holes 4 communicating with the crevice between the wall 1 and the liner 2. These holes are spaced apart at convenient distances and, preferably, do not exceed one-fourth of an inch in diameter. Each hole 4 is threaded, as shown in Fig. 2, to receive a gage or indicator for purposes of inspection.

Each hole may be provided with an indicator switch 5 in circuit with a signal which is adapted to warn the attendant of leaks in the liner 2.

The indicator switch 5 comprises a hollow tap 6 which is adapted to engage the threads 7 in the opening 4. A portion of the inner periphery of the tap 6 is threaded and terminates in a shoulder 8.

A metallic diaphragm 9 rests upon the shoulder 8 and is held in position by a threaded plug 10. The central portion of the plug 10 is provided with an opening which is adapted to receive an electric terminal 11 which is surrounded by insulating material 12 such as porcelain. The plug 10 is also provided with a small passage 13 to keep the pressure above the diaphragm equal to atmospheric pressure.

A plurality of switches 5 may be placed about the vessel, as shown in Fig. 4. One lead 14 of a source of current is attached to the vessel by suitable means. Each of the terminals 11 is electrically connected with a light 15 or other indicating means, shown in Fig. 4. A common lead 16 completes the circuit through the source of current.

Should a leak occur in the liner 2, fluid enters an opening 4 and exerts a pressure against the diaphragm 9 of the switch 5 causing it to bulge outwardly and to contact with the terminal 11 thereby closing the electrical circuit of the respective indicating means 15. The light 15 warns the attendant of the failure of the liner at or near the respective switch, and the vessel may be shut down and repaired at a convenient time thereafter.

Grooves 17 in the vessel wall 1 or liner 2 radiating from each of the holes 4 are preferably provided to more readily conduct any leaking fluid to the hole.

When not in use the holes 4 may be closed with suitable plugs 18, as shown in Fig. 1. A pressure gage 19, as shown in Fig. 1, may be applied to each of the openings, periodically, to indicate the presence of leaks in the liner.

A pressure gage may be permanently installed in each of the openings to be accessible for instant inspection.

Another method lies in applying a fluid pressure to the crevice between the liner and wall, and closing the openings by pressure gages. Where the fluid pressure so applied is greater than that inside the vessel, a drop in pressure, shown by any one gage, will indicate a leak.

The invention is particularly adaptable for vessels in which the liner sheet is not continuously welded to the body wall since a slight crevice is desirable between the liner and the body to permit the fluid which has penetrated through the liner sheet to reach one of the holes 4 and cause the indicating signal 15 to warn the operator of the leak. When such a defect in the liner is discovered in this manner, the use of the vessel may be discontinued for the purpose of repairing the liner.

When the vessel is shut down and the leak cannot be definitely located, though its general location is known, a suitable fluid under pressure is applied to the liner from the outside through one or more openings within the general region of the leak, thereby locating the leak on the inside. A gas having an odor or smoke may be desirable for this purpose.

While a preferred embodiment of the invention has been set forth, it is understood that various modifications may be employed within the scope of the claims.

I claim:

1. A pressure vessel comprising a metal shell capable of withstanding high pressures, a corrosion resistant liner incapable of withstanding high pressures so disposed in contact with the shell and welded thereto that the latter carries the pressure to which the vessel is subjected, the vessel having a narrow groove at the juncture of the shell and the liner which does not materially decrease the support for the liner and a passageway communicating with the groove and leading through the shell wall, and a pressure responsive alarm connected with the passageway to respond to fluid pressures, the alarm device being so disposed that it is responsive to fluid pressures that may be built up between the liner and shell if leaks occur in the liner.

2. A pressure vessel comprising a relatively thick shell for withstanding high pressures, a correspondingly thin corrosion resistant liner for protecting the inner surface of the shell maintained sufficiently in contact with the shell and welded thereto so that the shell carries the pressure to which the vessel is subjected, the shell having relatively shallow ducts that open toward the liner for conducting fluid that may penetrate the liner, and passages communicating with said ducts for conveying the fluid through the shell wall, and means responsive to fluid pressure associated with the passages for indicating the presence of fluid between the wall and liner.

3. A pressure vessel for containing corrosive fluids, comprising a heavy metal shell capable of withstanding pressures, the shell having a test passageway extending through it and grooves converging at the inner end of the passageway, a corrosion resistant liner in the nature of an inner container supported by the shell and welded thereto, and signaling means responsive to fluid pressure mounted in the passageway for signaling the building up of a fluid pressure between the liner and shell, thus indicating a leak in the liner and the exposing of the shell to a corrosive fluid.

4. A pressure vessel comprising a metal shell capable of withstanding high pressures, a corrosion resistant liner incapable of withstanding high pressures so disposed in contact with the shell and welded thereto that the latter carries the pressure to which the vessel is subjected, the vessel having a narrow groove at the juncture of the shell and the liner which does not materially decrease the support for the liner and a passageway communicating with the groove and leading through the shell wall.

5. A pressure vessel comprising a relatively thick shell for withstanding high pressures, a correspondingly thin corrosion resistant liner for protecting the inner surface of the shell maintained sufficiently in contact with the shell and welded thereto so that the shell carries the pressure to which the vessel is subjected, the shell having relatively shallow ducts that open toward the liner for conducting fluid that may penetrate the liner and passages communicating with said ducts for conveying the fluid through the shell wall.

6. A pressure vessel for containing corrosive fluids, comprising a heavy metal shell capable of withstanding pressures, the shell having a test passageway extending through it and grooves converging at the inner end of the passageway, and a corrosion resistant liner in the nature of an inner container supported by the shell and welded thereto.

ORRIN E. ANDRUS.